(12) United States Patent
Wang

(10) Patent No.: US 9,927,564 B2
(45) Date of Patent: Mar. 27, 2018

(54) LIGHT GUIDE PLATE, FRONT LIGHT SOURCE MODULE, DISPLAY MODULE AND DISPLAY DEVICE

(71) Applicant: BOE TECHNOLOGY GROUP CO., LTD., Beijing (CN)

(72) Inventor: Shang Wang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 15/091,780

(22) Filed: Apr. 6, 2016

(65) Prior Publication Data
US 2016/0299277 A1    Oct. 13, 2016

(30) Foreign Application Priority Data
Apr. 7, 2015   (CN) .......................... 2015 1 0161095

(51) Int. Cl.
*F21V 7/04*    (2006.01)
*F21V 8/00*    (2006.01)

(52) U.S. Cl.
CPC ......... *G02B 6/0003* (2013.01); *G02B 6/0055* (2013.01); *G02B 6/0061* (2013.01); *G02B 6/0073* (2013.01)

(58) Field of Classification Search
USPC ........................................................ 362/606
See application file for complete search history.

(56) References Cited

U.S. PATENT DOCUMENTS

| | | | |
|---|---|---|---|
| 2006/0022142 A1* | 2/2006 | Edward Robinson | ..................... G01T 1/2002 250/370.11 |
| 2007/0259206 A1* | 11/2007 | Oshio | ................... C04B 35/581 428/690 |
| 2011/0002140 A1* | 1/2011 | Tsukahara | ............ G02B 5/0236 362/602 |

(Continued)

FOREIGN PATENT DOCUMENTS

| | | |
|---|---|---|
| CN | 102374492 A | 3/2012 |
| CN | 103293762 A | 9/2013 |
| WO | 2015/030037 A1 | 3/2015 |

OTHER PUBLICATIONS

Chinese Office Action in Chinese Application No. 201510161095.X, dated May 4, 2017 with English translation.

(Continued)

*Primary Examiner* — Tuyen K Vo
(74) *Attorney, Agent, or Firm* — Collard & Roe, P.C.

(57) ABSTRACT

A light guide plate comprises a light guide plate body having a first light emitting surface, a second light emitting surface which is opposite to the first light emitting surface, and a plurality of side surfaces which connect the first light emitting surface and the second light emitting surface. The light guide plate further comprises a plurality of phosphor grid dots arranged on the first light emitting surface and a reflection layer arranged on each of the phosphor grid dots. The phosphor grid dots are capable of generating excitation light after being irradiated by light from a light source. The reflection layer is configured to reflect the excitation light of the phosphor grid dots to the light guide plate body. Embodiments of the present disclosure also provide a front light source module, a display module and a display device.

20 Claims, 3 Drawing Sheets

(56) References Cited

U.S. PATENT DOCUMENTS

| | | | |
|---|---|---|---|
| 2011/0128471 A1* | 6/2011 | Suckling | G02B 6/0041 |
| | | | 349/62 |
| 2011/0205466 A1* | 8/2011 | Lee | G02B 6/0055 |
| | | | 349/70 |
| 2012/0127734 A1* | 5/2012 | Tanimoto | F21V 23/006 |
| | | | 362/363 |
| 2012/0287665 A1* | 11/2012 | Hyakuta | G02B 6/0043 |
| | | | 362/602 |
| 2013/0133736 A1* | 5/2013 | Van Bommel | F21S 9/03 |
| | | | 136/256 |
| 2013/0286324 A1 | 10/2013 | Huang | |
| 2014/0253845 A1* | 9/2014 | Shibata | G02B 6/0055 |
| | | | 349/65 |
| 2015/0260903 A1* | 9/2015 | Kashima | G02B 6/0056 |
| | | | 349/65 |
| 2015/0286120 A1* | 10/2015 | Ohno | G02B 26/101 |
| | | | 353/84 |
| 2016/0238774 A1 | 8/2016 | Koike et al. | |

OTHER PUBLICATIONS

Second Chinese Office Action in Chinese Application No. 201510161095.X, dated Oct. 23, 2017 with English translation.

* cited by examiner

LIGHT GUIDE PLATE, FRONT LIGHT SOURCE MODULE, DISPLAY MODULE AND DISPLAY DEVICE

CROSS REFERENCE TO RELATED APPLICATIONS

Applicant claims priority under 35 U.S.C. § 119 of Chinese Application No. 201510161095.X filed on Apr. 7, 2015, the disclosure of which is incorporated by reference.

TECHNICAL FIELD

Embodiments of the present disclosure relate to a light guide plate, a front light source module, a display module and a display device.

BACKGROUND

For requirement of low power consumption and simulation of natural light reflection display, some display screens, such as bi-stable liquid crystal display screens, do not emit light and do not transmit light itself. Display screens of this kind are usually applied to electronic books for text display or electronic demoboards, and etc. Display screens of this kind cannot provide a display source by a backlight source due to its own characteristic limitation, and need an external light source which reflects natural light or lamp light to obtain a good effect of screen display. Therefore, display screens of such type can only be used in the day time or under a condition of presence of an additional illumination source, while under conditions of dark environment or without a light source, they cannot display normally.

To make the bi-stable liquid crystal display screen able to display normally under conditions of dark environment or without a light source, a front light source is usually required to be disposed at the front end of the bi-stable liquid crystal display screen. Typically, a light emitting diode (LED) light source for illumination is additionally provided at the periphery of the bi-stable liquid crystal display screen. In this way, illumination of the display screen can be achieved, but there is a defect of inhomogeneous illumination and a bright spot is formed at a position where the LED light source is disposed. Therefore, the conventional solution can eliminate the limitation to operation environment of the bi-stable liquid crystal display screen, while the display effect of the bi-stable liquid crystal display screen is unsatisfactory.

SUMMARY

At least one embodiment of the present disclosure provides a light guide plate, comprising a light guide plate body having a first light emitting surface, a second light emitting surface which is opposite to the first light emitting surface, and a plurality of side surfaces which connect the first light emitting surface and the second light emitting surface and at least one of which serves as a light incident surface. The light guide plate further comprises a plurality of phosphor grid dots arranged on the first light emitting surface and a reflection layer arranged on each of the phosphor grid dots. The phosphor grid dots are capable of generating excitation light after being excited by light from a light source. The reflection layer is configured to reflect the excitation light of the phosphor grid dots to the light guide plate body.

At least one embodiment of the present disclosure provides a front light source module comprising the light guide plate according to the above embodiment.

At least one embodiment of the present disclosure provides a display module, comprising a display panel, a reflection plate, and the front light source module according to the above embodiment; the front light source module is disposed at the side of a display surface of the display panel; in the front light source module, the second light emitting surface of the light guide plate body faces towards the display surface of the display panel; and the reflection plate is disposed at the side of a non-displaying surface of the display panel.

At least one embodiment of the present disclosure provides a display device comprising the display module according to the above embodiment.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
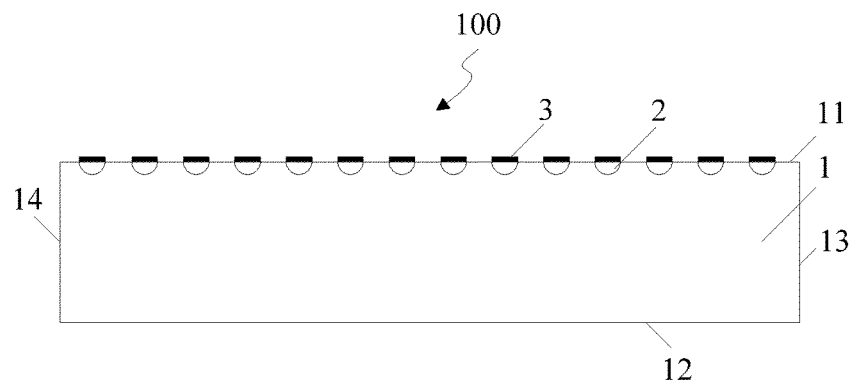
FIG. 1 is an illustrative structural view of a light guide plate according to one embodiment of the present disclosure.

Referring to FIG. 1, a light guide plate 100 according to one embodiment of the present disclosure comprises a light guide plate body 1 having a first light emitting surface 11 and a second light emitting surface 12 which are opposite to each other, and a plurality of side surfaces 13 which connect the first light emitting surface 11 and the second light emitting surface 12 and at least one of which serves as a light incident surface 14, further comprises a plurality of phosphor grid dots 2 arranged on the first light emitting surface 11 and a reflection layer 3 arranged on each phosphor grid dot 2. The phosphor grid dots 2 are capable of generating excitation light after being excited by the light from the light source. The reflection layer 3 reflects the excitation light of the phosphor grid dots 2 to the light guide plate body 1. The first light emitting surface 11 is a surface viewed by users.

In this embodiment, by providing the phosphor grid dots 2 and the reflection layer 3 on the first light emitting surface 11 of the light guide plate body 1, the excitation light generated by the phosphor grid dots 2 after being irradiated by the light from the light source is uniformly projected to the light guide plate body 1 by the reflection layer 3 and is mixed into white light, thereby achieving uniform illumination and preventing the bi-stable liquid crystal display screen from being affected by environmental light and thus improving display effect.

In consideration that the light provided by the light source has different intensities at different positions or regions within the light guide plate body 1, in order to enable the light guide plate body 1 to achieve uniform illumination, it is necessary to adjust the light within the light guide plate body 1 as follows.

Figure 2:
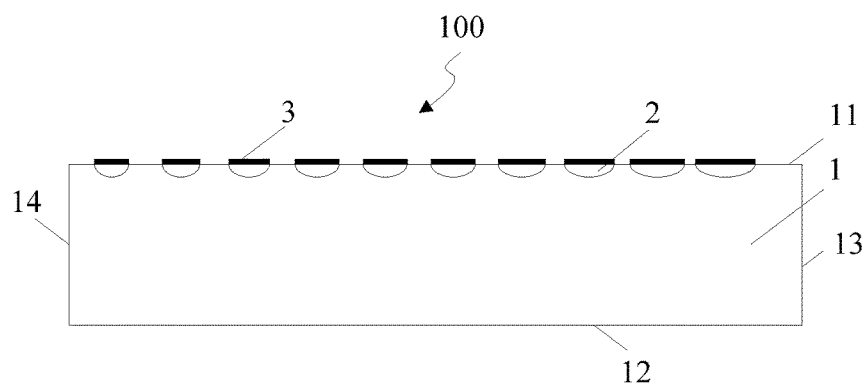
FIG. 2 is an illustrative structural view of a light guide plate according to another embodiment of the present disclosure.

Referring to FIG. 2, the phosphor grid dots 2 are uniformly distributed on the first light emitting surface 11 of the light guide plate body 1 and the dimensions of the phosphor grid dots 2 are gradually increased along a direction away from the light incident surface 14. It should be noted that the phosphor grid dots 2 being uniformly distributed on the first light emitting surface 11 can mean that, taking a center of the phosphor grid dot 2 or a specified point of the phosphor grid dot 2 as a reference, the distances between the centers or the specified points of adjacent phosphor grid dots 2 should be identical and centers or specified points in projected patterns of adjacent phosphor grid dots 2 on the first light emitting surface 11 are regularly distributed with identical distances on the first light emitting surface 11. For example, projected patterns of the phosphor grid dots 2 on the first light emitting surface 11 are of a circular shape, and centers of the respective circles are regularly distributed on the first light emitting surface 11 with identical distances, while radii of circles (which being equivalent to the dimensions of the phosphor grid dots 2) at different positions are different. Of course, the projected patterns of the phosphor grid dots 2 on the first light emitting surface 11 can be of other geometric shape, for example, oval, triangular, pentagonal, hexagonal or rectangular shape. In the present embodiment, the light provided by the light source has different intensities at different positions in the light guide plate body 1, and by setting the dimensions of the phosphor grid dots 2 at different positions on the first light emitting surface 11 of the light guide plate body 1, excitation light generated by the phosphor grid dots 2 after being excited has substantially the same intensity within the light guide plate body 1, thereby achieving uniform illumination.

Figure 3:
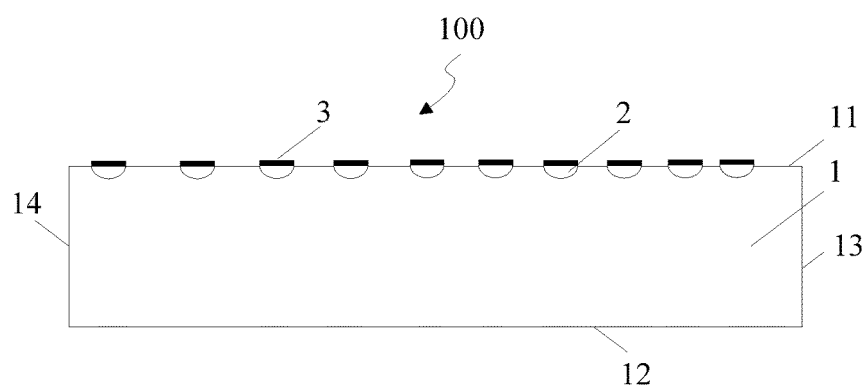
FIG. 3 is an illustrative structural view of a light guide plate according to yet another embodiment of the present disclosure.

Referring to FIG. 3, the respective phosphor grid dots 2 have the same dimension, and the distribution density of the phosphor grid dots 2 on the first light emitting surface 11 of the light guide plate body 1 is gradually increased along the direction facing away from the light incident surface 14. In the present embodiment, the light provided by the light source has different intensities at different positions in the light guide plate body 1, and by setting the distribution density of the phosphor grid dots 2 at different positions on the first light emitting surface 11 of the light guide plate body 1, excitation light generated by the phosphor grid dots 2 after being excited has substantially the same intensity within the light guide plate body 1, thereby achieving uniform illumination.

Of course, there can be a combination of FIG. 2 and FIG. 3 in which dimensions of the phosphor grid dots 2 distributed on different positions or regions of the first light emitting surface 11 of the light guide plate body 1 are made different and the distribution densities are also made different. Details are omitted here.

Based on various of light sources, the phosphor grid dots 2 can be prepared by a mixture of a green phosphor and a red phosphor, or can be prepared by a mixture of a green phosphor, a red phosphor and a yellow phosphor, or can be prepared by a yellow phosphor.

In one embodiment of the present disclosure, the phosphor grid dots comprise mixed phosphor formed by mixing the green phosphor of $BaMgAl_{10}O_{17}:Eu^{3+}:Mn^{2+}$ and the red phosphor of $Y_2O_2S:Eu^{3+}$. Such a mixed phosphor is suitable for a case in which the light source is an ultraviolet LED light source. Alternatively, the phosphor grid dots comprise yellow phosphor of YAG:Ce which is suitable for a case in which a blue LED light source is used.

In one embodiment of the present disclosure, the light guide plate body 1 is flat plate-shaped or wedge-shaped.

The above embodiments of the present disclosure have the following advantageous effects. By providing the phosphor grid dots and the reflection layer on the first light emitting surface of the light guide plate body, the excitation light generated by the phosphor grid dots after being excited by the light emitted from the light source is uniformly projected to the light guide plate body by the reflection layer and is mixed into white light, thereby achieving uniform illumination and preventing the bi-stable liquid crystal display screen from being affected by environmental light and thus improving display effect.

Figure 4:
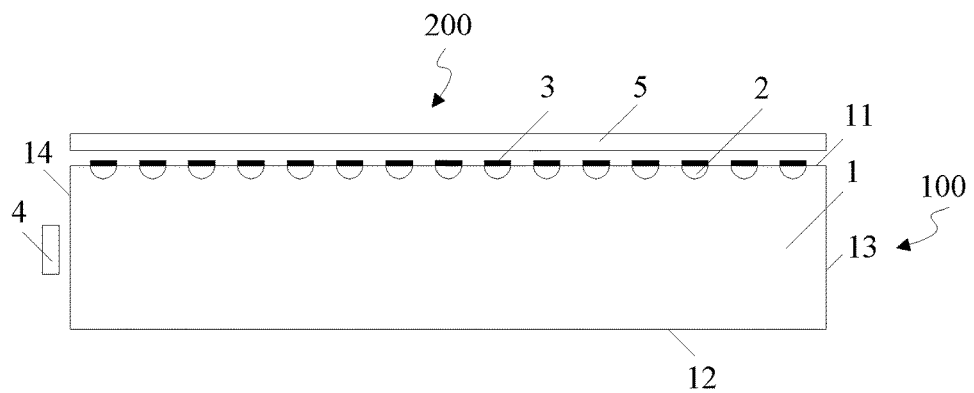
FIG. 4 is an illustrative structural view of a front backlight module according to one embodiment of the present disclosure.

Referring to FIG. 4, at least one embodiment of the present disclosure provides a front light source module 200 comprising the light guide plate 100 according to the above embodiments. As illustrated in FIG. 1, the light guide plate 100 comprises a light guide plate body 1 having a first light emitting surface 11 and a second light emitting surface 12 which are opposite to each other, and a plurality of side surfaces 13 which connect the first light emitting surface 11 and the second light emitting surface 12 and at least one of which serves as a light incident surface 14. The light guide plate 100 further comprises a plurality of phosphor grid dots 2 arranged on the first light emitting surface 11 and a reflection layer 3 arranged on each phosphor grid dot 2. The phosphor grid dots 2 generate excitation light after being excited by the light from the light source. The reflection layer 3 reflects the excitation light of the phosphor grid dots 2 to the light guide plate body 1.

The front light source module 200 further comprises an ultraviolet LED light source 4 which is disposed on the side of the light incident surface 14 of the light guide plate body 1 and an absorbing sheet 5 configured to absorb ultraviolet light which is disposed above the first light emitting surface 11 of the light guide plate body 1.

The phosphor grid dots comprise mixed phosphor formed by mixing the green phosphor of $BaMgAl_{10}O_{17}:Eu^{3+}:Mn^{2+}$ and the red phosphor of $Y_2O_2S:Eu^{3+}$.

In this embodiment, the absorbing sheet 5 is disposed above the first light emitting surface 11 of the light guide plate body 1, and can absorb the ultraviolet light from the light guide plate 100, thereby improving display effect.

The above embodiment of the present disclosure has the following advantageous effects. By providing the phosphor grid dots and the reflection layer on the first light emitting surface of the light guide plate body, the excitation light generated by the phosphor grid dots after being excited by the light from the light source is uniformly projected into the light guide plate body by the reflection layer and is mixed into white light, thereby achieving uniform illumination and preventing the bi-stable liquid crystal display screen from being affected by environmental light and thus improving display effect.

Figure 5:
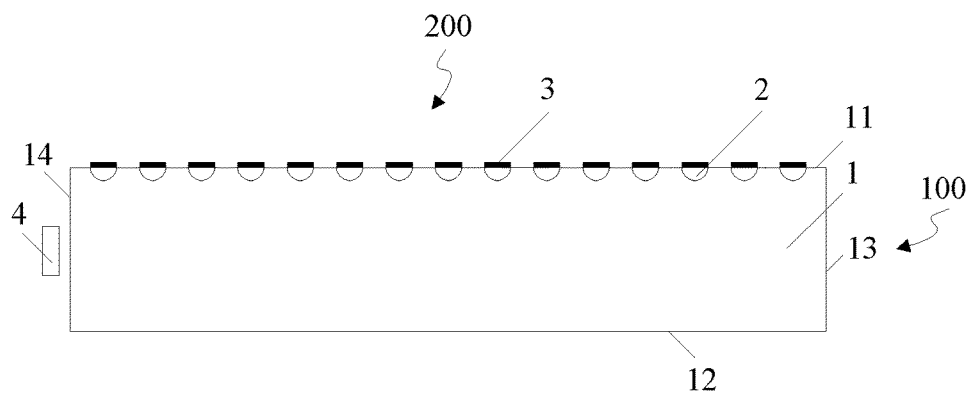
FIG. 5 is an illustrative structural view of a front backlight module according to another embodiment of the present disclosure.

Referring to FIG. 5, at least one embodiment of the present disclosure provides a front light source module 200 comprising the light guide plate 100 as provided by the above embodiments. As illustrated in FIG. 1, the light guide plate 100 comprises a light guide plate body 1 having a first light emitting surface 11 and a second light emitting surface 12 which are opposite to each other, and a plurality of side surfaces 13 which connect the first light emitting surface 11 and the second light emitting surface 12 and at least one of which serves as a light incident surface 14. The light guide plate 100 further comprises a plurality of phosphor grid dots 2 arranged on the first light emitting surface 11 and a reflection layer 3 arranged on each phosphor grid dot 2. The phosphor grid dots 2 generate excitation light after being excited by the light emitted from the light source. The reflection layer 3 reflects the excitation light of the phosphor grid dots 2 to the light guide plate body 1.

The phosphor grid dots comprise yellow phosphor of YAG:Ce. The front light source module 200 comprises a blue LED light source which is disposed at the side of the light incident surface 14 of the light guide plate.

The present embodiment has the following advantageous effects. By providing the phosphor grid dots and the reflection layer on the first light emitting surface of the light guide plate body, the excitation light generated by the phosphor grid dots after being excited by the light from the light source is uniformly projected into the light guide plate body by the reflection layer and is mixed into white light, thereby achieving uniform illumination and preventing the bi-stable liquid crystal display screen from being affected by environmental light and thus improving display effect.

Figure 6:
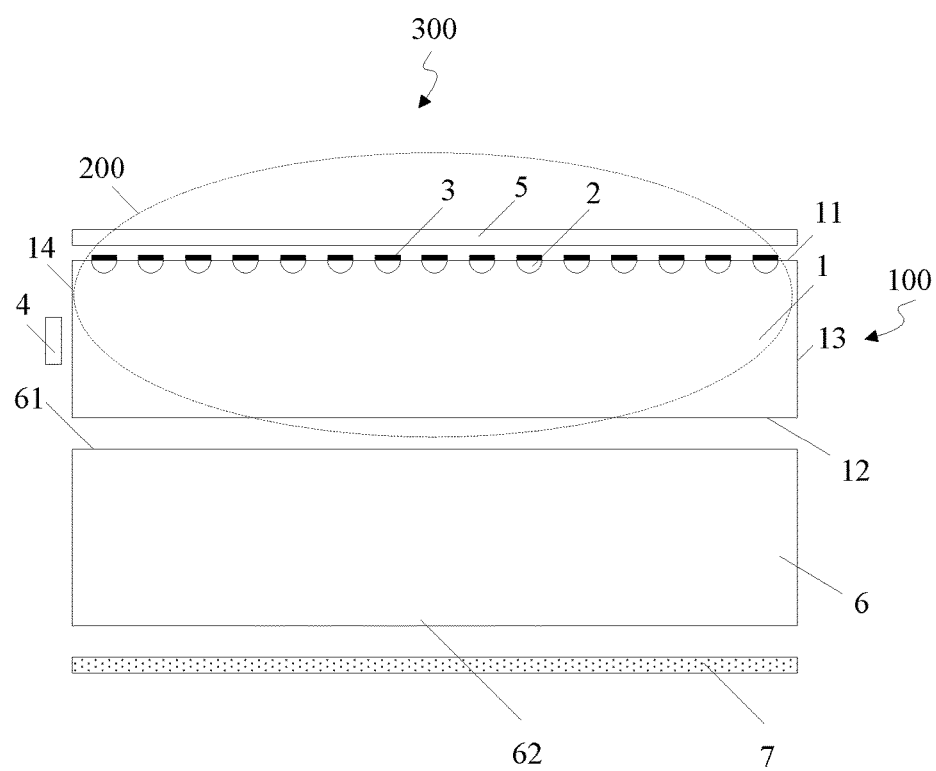
FIG. 6 is an illustrative structural view of a display module according to one embodiment of the present disclosure.

Referring to FIG. 6, at least one embodiment of the present disclosure provides a display module 300 comprising a display panel 6 and further comprising a reflection plate 7 and the front light source module 200 according to the above embodiment. The front light source module 200 is disposed at the side of a displaying surface 61 of the display panel 6.

In the front light source module 200, the second light emitting surface 12 of the light guide plate body 1 of the light guide plate 100 faces towards the displaying surface 61 of the display panel 6, and the reflection plate 7 is disposed at the side of a non-displaying surface 62 of the display panel 6.

The above embodiment of the present disclosure has the following advantageous effects. By providing the phosphor grid dots and the reflection layer on the first light emitting surface of the light guide plate body, the excitation light generated by the phosphor grid dots having been excited by the light from the light source is uniformly projected into the light guide plate body by the reflection layer and is mixed into white light, thereby achieving uniform illumination and preventing the bi-stable liquid crystal display screen from being affected by environmental light and thus improving display effect.

At least one embodiment of the present disclosure provides a display device comprising the display module according to the above embodiment.

The above embodiment of the present disclosure has the following advantageous effects. By providing the phosphor grid dots and the reflection layer on the first light emitting surface of the light guide plate body, the excitation light generated by the phosphor grid dots after being excited by the light emitted from the light source is uniformly projected into the light guide plate body by the reflection layer and is mixed into white light, thereby achieving illumination with uniform brightness and preventing the bi-stable liquid crystal display screen from being affected by environmental light and thus improving display effect.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201510161095.X filed on Apr. 7, 2015, the disclosure of which is hereby entirely incorporated by reference as a part of the present disclosure.

What is claimed is:

1. A light guide plate, comprising:
a light guide plate body having a first light emitting surface, a second light emitting surface which is opposite to the first light emitting surface, and a plurality of side surfaces which connect the first light emitting surface and the second light emitting surface and at least one of which serves as a light incident surface;
a plurality of phosphor grid dots arranged on the first light emitting surface; and
a reflection layer arranged on each of the phosphor grid dots,
wherein the phosphor grid dots are capable of generating excitation light after being excited by light from a light source, and the reflection layer is configured to reflect the excitation light of the phosphor grid dots to the light guide plate body.

2. The light guide plate according to claim 1, wherein the phosphor grid dots are regularly distributed on the first light emitting surface of the light guide plate body and dimensions of the phosphor grid dots are gradually increased along a direction away from the light incident surface.

3. The light guide plate according to claim 1, wherein a distribution density of the phosphor grid dots on the first light emitting surface of the light guide plate body is gradually increased along the direction facing away from the light incident surface.

4. The light guide plate according to claim 1, wherein the phosphor grid dots comprise mixed phosphor formed by mixing green phosphor of $BaMgAl_{10}O_{17}:Eu^{3+}:Mn^{2+}$ and red phosphor of $Y_2O_2S:Eu^{3+}$, or the phosphor grid dots comprise yellow phosphor of YAG:Ce.

5. The light guide plate according to claim 2, wherein the phosphor grid dots comprise mixed phosphor formed by mixing green phosphor of $BaMgAl_{10}O_{17}:Eu^{3+}:Mn^{2+}$ and red phosphor of $Y_2O_2S:Eu^{3+}$, or the phosphor grid dots comprise yellow phosphor of YAG:Ce.

6. The light guide plate according to claim 3, wherein the phosphor grid dots comprise mixed phosphor formed by mixing green phosphor of $BaMgAl_{10}O_{17}:Eu^{3+}:Mn^{2+}$ and red phosphor of $Y_2O_2S:Eu^{3+}$, or the phosphor grid dots comprise yellow phosphor of YAG:Ce.

7. The light guide plate according to claim 1, wherein light guide plate body is flat plate-shaped or wedge-shaped.

8. A front light source module, comprising the light guide plate according to claim 1.

9. A front light source module, comprising the light guide plate according to claim 2.

10. A front light source module, comprising the light guide plate according to claim 3.

11. The front light source module according to claim 8, wherein the phosphor grid dots comprise mixed phosphor formed by mixing green phosphor of $BaMgAl_{10}O_{17}:Eu^{3+}:Mn^{2+}$ and red phosphor of $Y_2O_2S:Eu^{3+}$;
  the front light source module further comprises:
    an ultraviolet LED light source which is disposed on the side of the light incident surface of the light guide plate body, and
    an absorbing sheet configured to absorb ultraviolet light which is disposed above the first light emitting surface of the light guide plate body.

12. The front light source module according to claim 8, wherein the phosphor grid dots comprise yellow phosphor of YAG:Ce;
  the front light source module further comprises a blue LED light source which is disposed at the side of the light incident surface of the light guide plate body.

13. The front light source module according to claim 9, wherein the phosphor grid dots comprise mixed phosphor formed by mixing green phosphor of $BaMgAl_{10}O_{17}:Eu^{3+}:Mn^{2+}$ and red phosphor of $Y_2O_2S:Eu^{3+}$;
  the front light source module further comprises:
    an ultraviolet LED light source which is disposed on the side of the light incident surface of the light guide plate body, and
    an absorbing sheet configured to absorb ultraviolet light which is disposed above the first light emitting surface of the light guide plate body.

14. The front light source module according to claim 9, wherein the phosphor grid dots comprise yellow phosphor of YAG:Ce;
  the front light source module further comprises a blue LED light source which is disposed at the side of the light incident surface of the light guide plate body.

15. The front light source module according to claim 10, wherein the phosphor grid dots comprise mixed phosphor formed by mixing green phosphor of $BaMgAl_{10}O_{17}:Eu^{3+}:Mn^{2+}$ and red phosphor of $Y_2O_2S:Eu^{3+}$;
  the front light source module further comprises:
    an ultraviolet LED light source which is disposed on the side of the light incident surface of the light guide plate body, and
    an absorbing sheet configured to absorb ultraviolet light which is disposed above the first light emitting surface of the light guide plate body.

16. The front light source module according to claim 10, wherein the phosphor grid dots comprise yellow phosphor of YAG:Ce;
  the front light source module further comprises a blue LED light source which is disposed at the side of the light incident surface of the light guide plate body.

17. A display module, comprising a display panel, a reflection plate, and the front light source module according to claim 8,
  wherein the front light source module is disposed at the side of a display surface of the display panel;
  in the front light source module, the second light emitting surface of the light guide plate body faces towards the displaying surface of the display panel; and
  the reflection plate is disposed at the side of a non-displaying surface of the display panel.

18. A display module, comprising a display panel, a reflection plate, and the front light source module according to claim 9,
  wherein the front light source module is disposed at the side of a display surface of the display panel;
  in the front light source module, the second light emitting surface of the light guide plate body faces towards the displaying surface of the display panel;
  the reflection plate is disposed at the side of a non-displaying surface of the display panel.

19. A display module, comprising a display panel, a reflection plate, and the front light source module according to claim 10,
  wherein the front light source module is disposed at the side of a display surface of the display panel;
  in the front light source module, the second light emitting surface of the light guide plate body faces towards the displaying surface of the display panel; and
  the reflection plate is disposed at the side of a non-displaying surface of the display panel.

20. A display device, comprising the display module according to claim 17.

* * * * *